United States Patent [19]
Bracken et al.

[11] Patent Number: 5,943,185
[45] Date of Patent: Aug. 24, 1999

[54] DATA STORAGE DRIVE AND CARTRIDGE HAVING ALIGNMENT OPENINGS FOR CARTRIDGE MOUNTING AND EJECTION

[75] Inventors: Allen T. Bracken, Layton; Doug Mayne, Ogden; Jay Muse, Clearfield; Brian Schick, Eden; Fred Thomas, III, Ogden, all of Utah

[73] Assignee: Iomega Corporation, Roy, Utah

[21] Appl. No.: 09/033,825

[22] Filed: Mar. 3, 1998

Related U.S. Application Data

[62] Division of application No. 08/746,096, Nov. 6, 1996, abandoned.

[51] Int. Cl.[6] .................................................. G11B 17/04
[52] U.S. Cl. .................................................. 360/99.06
[58] Field of Search .............................. 360/99.06, 99.02

[56] References Cited

U.S. PATENT DOCUMENTS

| | | | |
|---|---|---|---|
| 4,553,175 | 11/1985 | Baumeister | 358/310 |
| 4,570,188 | 2/1986 | Ichiyanagi | 358/335 |
| 4,797,761 | 1/1989 | Cocco | 360/99.06 |
| 4,803,576 | 2/1989 | Ohkita et al. | 360/99.08 |
| 5,034,804 | 7/1991 | Sasaki et al. | 358/41 |
| 5,055,950 | 10/1991 | Kimura et al. | 360/74.5 |
| 5,161,770 | 11/1992 | Morehouse et al. | 248/632 |
| 5,204,793 | 4/1993 | Plonczak | 360/133 |
| 5,408,374 | 4/1995 | Morehouse et al. | 360/105 |
| 5,426,562 | 6/1995 | Morehouse et al. | 361/685 |
| 5,434,618 | 7/1995 | Hayashi et al. | 348/231 |
| 5,442,266 | 8/1995 | Morehouse et al. | 318/272 |
| 5,448,433 | 9/1995 | Morehouse et al. | 360/97.02 |
| 5,469,314 | 11/1995 | Morehouse et al. | 360/105 |
| 5,481,420 | 1/1996 | Cardona et al. | 360/99.06 |
| 5,481,423 | 1/1996 | Aoki | 360/99.06 |
| 5,486,964 | 1/1996 | Morehouse et al. | 360/105 |
| 5,508,864 | 4/1996 | Briggs et al. | 360/106 |
| 5,530,607 | 6/1996 | Spendlove | 360/105 |

*Primary Examiner*—A. J. Heinz
*Attorney, Agent, or Firm*—Woodcock Washburn Kurtz Mackiewicz & Norris LLP

[57] ABSTRACT

A disk insertion and ejection mechanism for use in a mini disk drive. The insertion and ejection mechanism operates by using cooperating cammed surfaces on a mini-cartridge and a movable sled within the mini disk drive. The cams operate to keep the mini-cartridge raised above the drive spindle during cartridge insertion. When the mini-cartridge is fully inserted into the drive, the cams in the drive mate with cam openings on the disk and the cartridge can move down onto the spindle. Additionally, wedges in the drive and wedge cut-outs on the cartridge cooperate to lock a cartridge into the drive during insertion. During cartridge ejection, the cams within the drive cooperate with the cammed surfaces in the cartridge to raise the cartridge above the spindle. At that moment, the cartridge is forced from the drive.

9 Claims, 17 Drawing Sheets

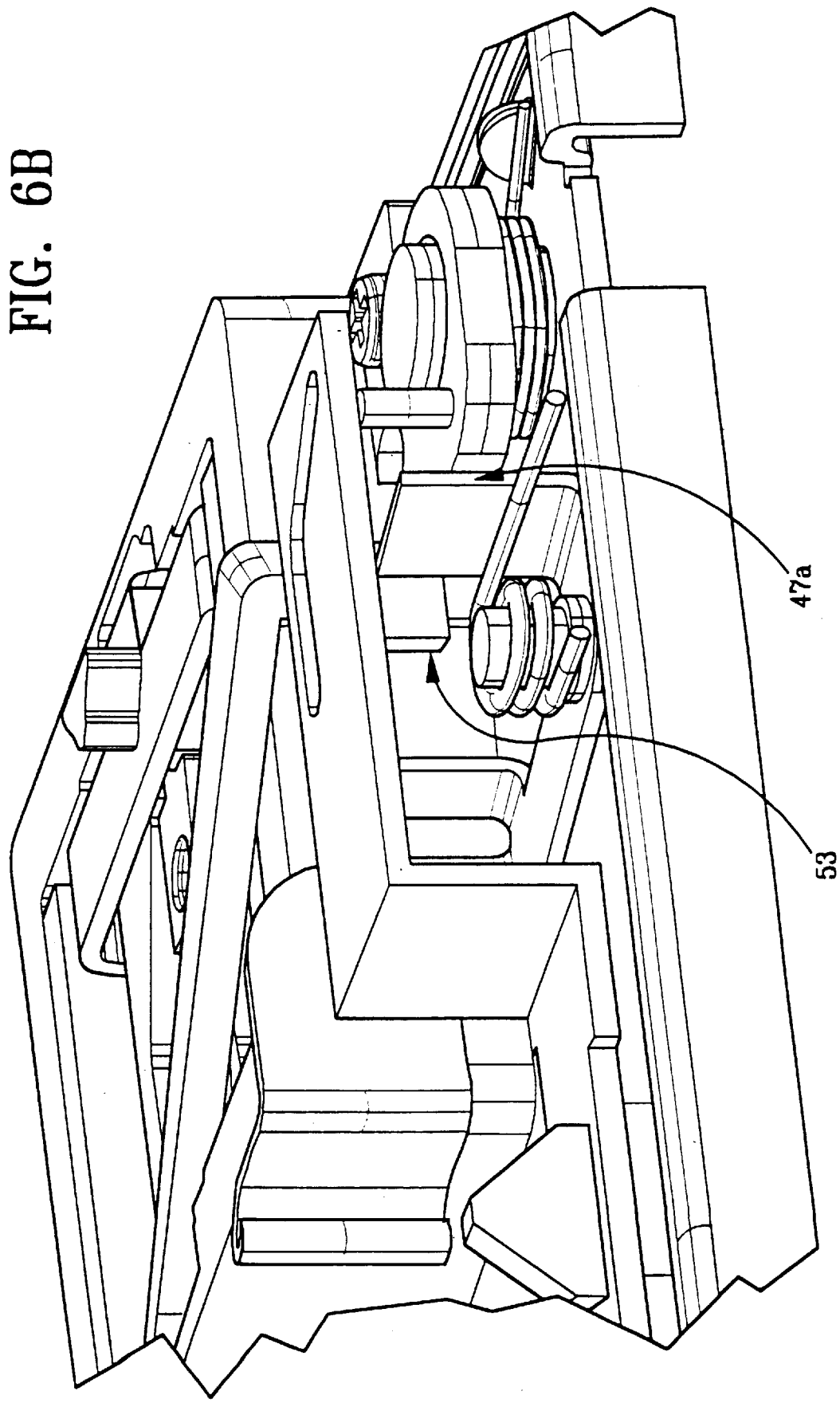

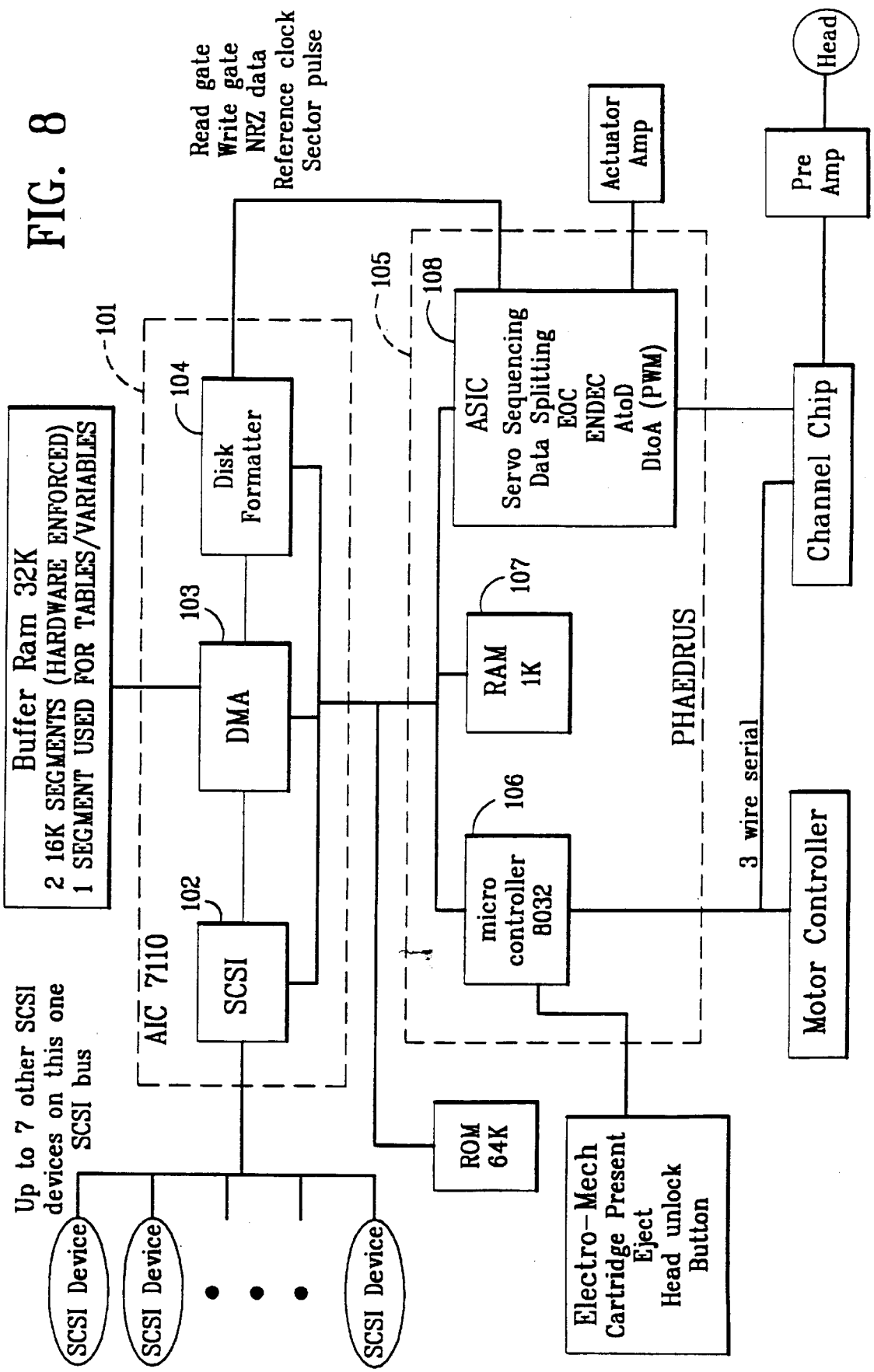

DATA STORAGE DRIVE AND CARTRIDGE HAVING ALIGNMENT OPENINGS FOR CARTRIDGE MOUNTING AND EJECTION

This application is a divisional of application Ser. No. 08/746,096 filed Nov. 6, 1996, now abandoned.

BACKGROUND OF THE INVENTION

This invention relates to an interchangeable cartridge data storage system and more particularly to a storage system in which a mini-cartridge is compatible with devices generating signals representing different functions and the mini-cartridge is compatible, by use of a caddy, with a full size drive which can transfer signals between that drive and a host computer.

Microprocessors and supporting computer technologies are rapidly increasing in speed and computing power while decreasing in cost and size. These factors have led to the broad application of microprocessors to an array of electronic products, such as hand-held computers, digital cameras, cellular phones and the like. All of these devices have, in effect, become computers with particular application-specific attributes. For this new breed of computer products, enormous flexibility is gained by the ability to exchange data files and store computer software.

A variety of proprietary storage devices have been used in computer products. For example, hand-held computers have used integrated circuit memory cards ("memory cards") as the primary information storage media. Memory cards include memory storage elements, such as static random access memory (SRAM), or programmable and erasable non-volatile memory, such as "flash" memory. Memory cards each are typically the size of a conventional credit card and are used in portable computers in place of hard disk drives and floppy disk drives. Furthermore, memory cards enhance the significant advantages of the size, weight, and battery lifetime attributes of the portable computer and increase portability of the storage media. However, because of the limited memory density attainable in each memory card and the high cost of the specialized memory chips, using memory cards in hand-held computers imposes limitations not encountered in less portable computers, which typically use more power-consuming and heavier hard and floppy disk drives as their primary storage media.

Other of these computer products, such as the digital camera, have employed miniature video disks as the storage media. For example, U.S. Pat. No. 4,553,175 issued Nov. 12, 1985 to Baumeister discloses a digital camera configured to store information on a magnetic disk. In Baumeister, a signal processor receives signals representative of a picture from a photo sensor. Those signals are recorded on a magnetic disk for later processing. Unfortunately, the video disk storage product provides limited storage capacity. For that and other reasons (e.g., power consumption and cost), the video disk has not been used in other computer products. As a result, interchanging data from one of these digital cameras with other computer products, such as a hand-held computer, is not readily achieved.

Miniature hard disk drives have also been suggested for use in portable computer products. For example, U.S. Pat. No. 5,469,314 issued Nov. 21, 1995 to Morehouse et al. discloses a miniature hard drive for use in portable computer applications. In Morehouse, a hard disk drive is described that is approximately 50 mm in diameter. While addressing many of the problems presented by storage requirements in portable computers, the obvious problem of removability of the storage media is still present.

Thus, Applicants have recognized that there is a long-felt need for a storage media that has adequate storage capacity and that addresses the need for reduced size and interchangeability across a multitude of computer products.

SUMMARY OF THE INVENTION

In accordance with the present invention a mini-cartridge is provided for mini drives in a plurality of hand-held devices which generate signals representing different functions performed by different classes of the devices. For example, the devices include digital cameras, electronic books, global positioning systems, personal digital systems, portable games and cellular phones. Each of these devices has a mini drive for writing signals and reading signals representing the functions to and from a magnetic medium in the mini-cartridge. In this way, signals representing the diverse functions performed by the different classes of devices are recorded on the mini-cartridge. The hand-held devices incorporating the present invention provide and create a single means of capturing, moving and storing information across multiple products.

The mini-cartridge can be inserted into the mini drive of other devices. For example, a reporter could snap a photograph with a digital camera having a mini drive of the present invention, use a mini drive to save and transport the image to a mini drive equipped cell phone and then transmit the image to a news bureau, anywhere in the world.

The mini-cartridge from that cell phone can then be operated upon by a personal computer. Further by way of example, the mini-cartridge can be inserted into a caddy which accommodates the mini-cartridge to make it compatible with a full-size disk drive. The ZIP drive, marketed by Iomega Corporation, is typical of a full-size drive which can read the mini-cartridge because the caddy, in which the cartridge is inserted, makes it compatible with the full-size drive.

Full-size drives, such as the ZIP drive, are commonly included in personal computer systems. The full-size drive makes the signals recorded on a mini-cartridge readable. These signals are transmitted through the input/output channel and interface to a host computer which operates on the signals in the same manner as any other magnetically recorded signals.

As further example of the uses and advantages of the present invention, the mini-cartridge can be used in digital cameras similar to the way film is used in a traditional camera, capturing up to 70–80 images on a single disk at a low cost per disk. Currently, consumers must pay hundreds of dollars for a flash memory card holding the same number of images.

The mini drive and cartridge can be used to quickly transfer a phone number list from a PDA to a cell phone, or save a fax on a mini-cartridge and use it in a cell phone to transmit it wirelessly.

Hand-held gaming devices equipped with mini drives can also be an ideal means of distributing games for hand-held gaming devices at lower costs. There is an additional possibility of updating games via the Internet, saving the new version on a mini-cartridge and then using it in a hand-held game player.

GPS (global positioning systems) using a mini drive can download maps from the Internet, or a local map on a mini-cartridge can be purchased for use in a GPS system, while hiking or in a car equipped with a GPS device.

A PDA (personal digital assistant) with a mini drive is an affordable storage technology for PC companions and hand-held devices. They also serve as a high-capacity, affordable means to save and move applications to/from a PC and PDA.

The present invention is designed to provide high capacity at a low cost for hand-held devices. The foregoing and other objects, features and advantages of the invention will be better understood from the following more detailed description and appending claims.

SHORT DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 6B shows the sled tab engagement with the eject tab;

FIG. 8 shows the interface between the full-size drive and the host computer.

DESCRIPTION OF THE PREFERRED EMBODIMENT

Figure 1:
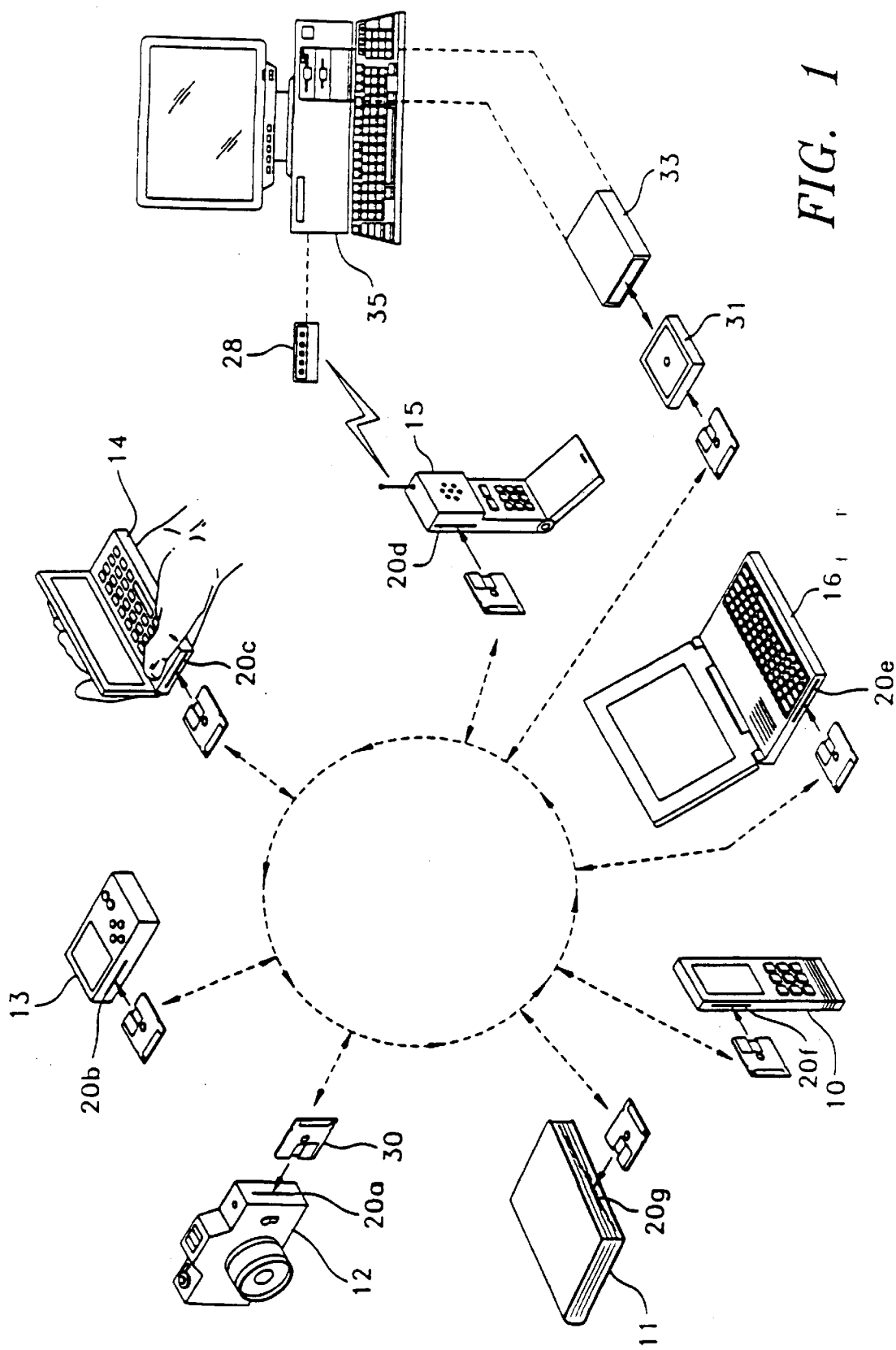
FIG. 1 is a diagram of the interchangeable mini-cartridge of the present invention, including a plurality of devices each having a mini disk drive, and including a caddy to adapt the mini-cartridge to a full-size drive of a host computer.

FIG. 1 shows a plurality of devices 10–15 which generate signals representing different functions performed by different classes of the devices. For example, the global positioning system 10 can generate signals representing navigational position. Electronic book 11, digital camera 12, personal digital assistant (PDA/Palmtop) 13, portable game 14, cellular phone 15, and laptop computer 16 each generate signals representing the function performed by that particular device.

In accordance with the present invention, each of these devices has a mini drive 20 for writing the signals and reading the signals from a magnetic recording medium so that diverse functions performed by different classes are recorded on the devices. Each device has a mini drive 20, i.e. a mini drive 20f for the global positioning system 10, a mini drive 20g for the electronic book 11, a mini drive 20a for the digital camera 12, a mini drive 20b for the portable game 13, a mini drive 20c for the PDA/palmtop 14, a mini drive 20d for the cellular phone 15 and a mini drive 20e for the laptop computer 16.

A mini-cartridge 30 has a magnetic recording medium on which the signals from the devices are recorded. The mini-cartridge 30 is compatible with the mini drives 20. Standard file formats maintain compatibility between devices. In the preferred embodiment, mini drives 20 have a PCMCIA type 3 form factor. This form factor is commonly used in portable personal computers. For example, this form factor could be used for the modem port of a notebook computer. The PCMCIA type 3 form factor is quite small so the mini drive 20 readily fits into all of the portable, hand-held devices shown in FIG. 1. The mini-drive 20 is insertable into and removable from the device just as the PCMCIA modem is insertable into and removable from the PCMCIA slot of a notebook computer. Alternatively, the drive 20 could be hard wired into the device. In both cases, the device generates a digital function signal which is connected to the magnetic heads of the drive so that the digital function signal can be written on the magnetic medium of the mini-cartridge 30. As an example, a digital function signal representing a picture taken in a digital camera 12 is recorded on a mini-cartridge 30. This digital function signal can be read by other classes of devices when the cartridge 30 is inserted into other devices.

Figure 2A:
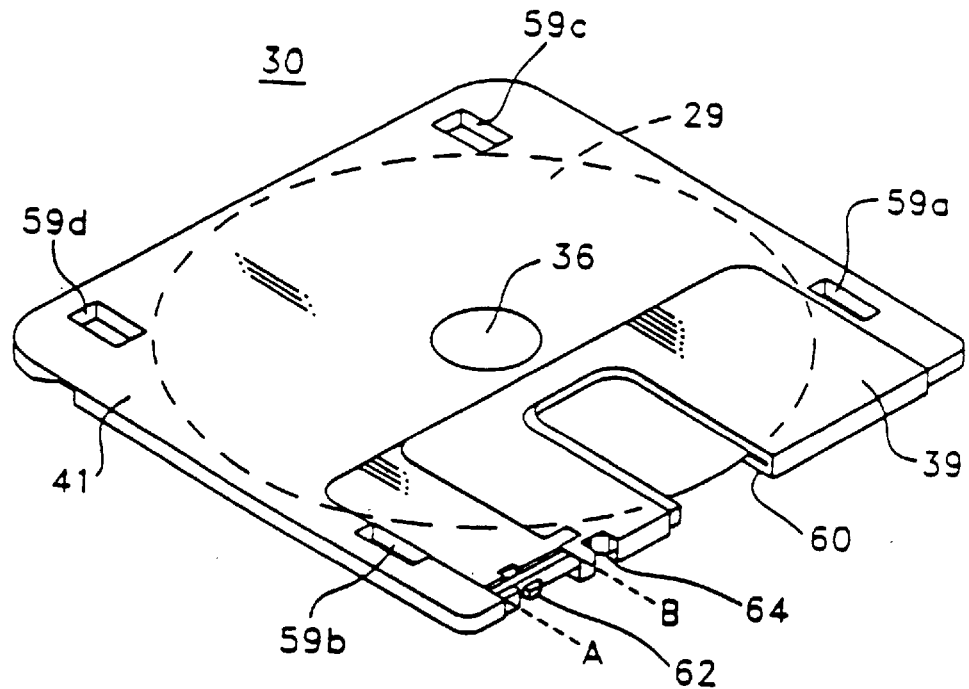
FIG. 2A shows a top view of the mini-cartridge with the shutter retracted exposing a magnetic medium.
Figure 2B:
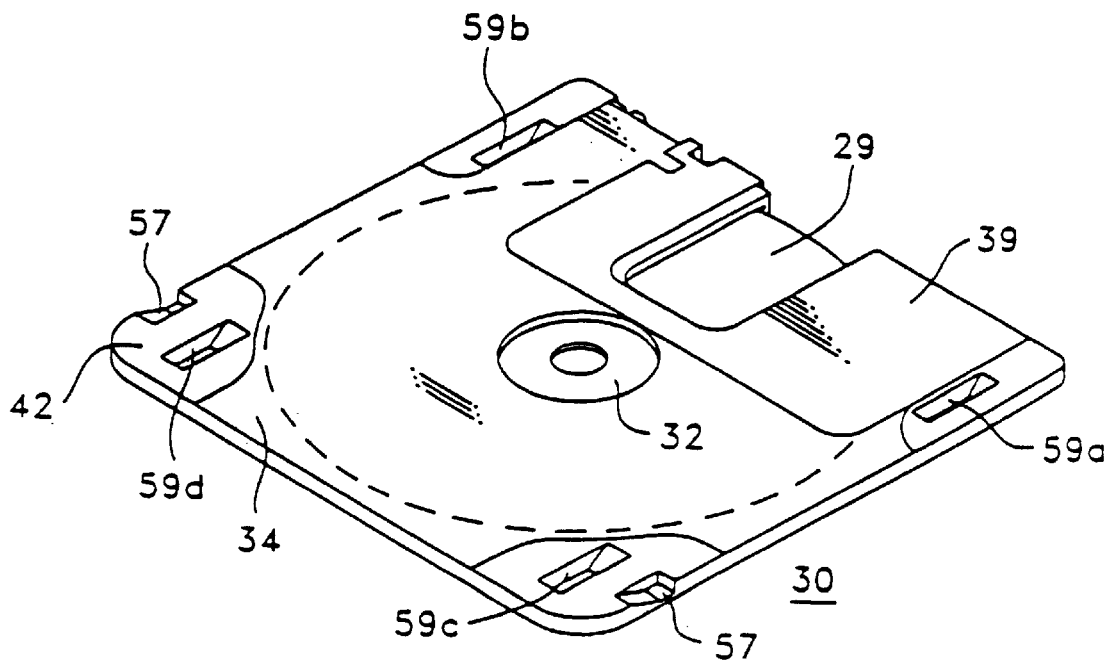
FIG. 2B shows a bottom view of the mini-cartridge with the shutter retracted exposing the magnetic medium.

Referring to FIGS. 2A and 2B a mini-cartridge 30 in accordance with the present invention is depicted. FIG. 2A presents an isometric top view of mini-cartridge 30, and FIG. 2B presents an isometric bottom view of mini-cartridge 30. Mini-cartridge 30 is fabricated from a magnetic medium 29 disposed between a top shell portion 41 and a bottom shell portion 34. Top shell portion 41 has four integrally formed pads 42, one at each corner. Bottom shell portion 34 attaches to top shell portion 41 within pads 42 and is formed from a substantially rigid materially, such as sheet steel. Both the top shell portion 41 and the bottom shell portion 34 have cut-outs such that aperture 60 is formed in one end of cartridge 30 when the shell halves are brought together.

Shutter 39 is connected over the aperture end of the mini-cartridge 30 to close the aperture and protect the magnetic medium 29 whenever cartridge 30 is outside of a mini drive 20. As such, shutter 39 slides to a first position indicated by line B, revealing magnetic media 29, and slides to a second position indicated by line A, closing the aperture and protecting magnetic media 29 from contamination and the like. When shutter 39 is closed (i.e., moved to the position as indicated by line A), shutter latch 62 engages the slot 64 and locks shutter 39 in place. Thus, in order to move shutter 39 to the open (B) position, the latch 62 must first be depressed to unlock shutter 39. Four cam openings 59 are formed through the corresponding pads 42 of the top shell portion 41 and two cartridge lock cut-outs 57 are also formed in the top shell. Additionally, the top shell portion 41 has a through hole to allow a thinner mini-cartridge 30 while accommodating a drive spindle (not shown). As such, a seal 36, made of substantially thinner material than the material used to form top shell portion 41, is attached to the shell to cover the hole. Magnetic medium 29, as indicated by the dashed line in FIGS. 2A and 2B, is sandwiched between the shell portions 41, 34 and is allowed to float unattached to either shell portion.

Figure 2C:
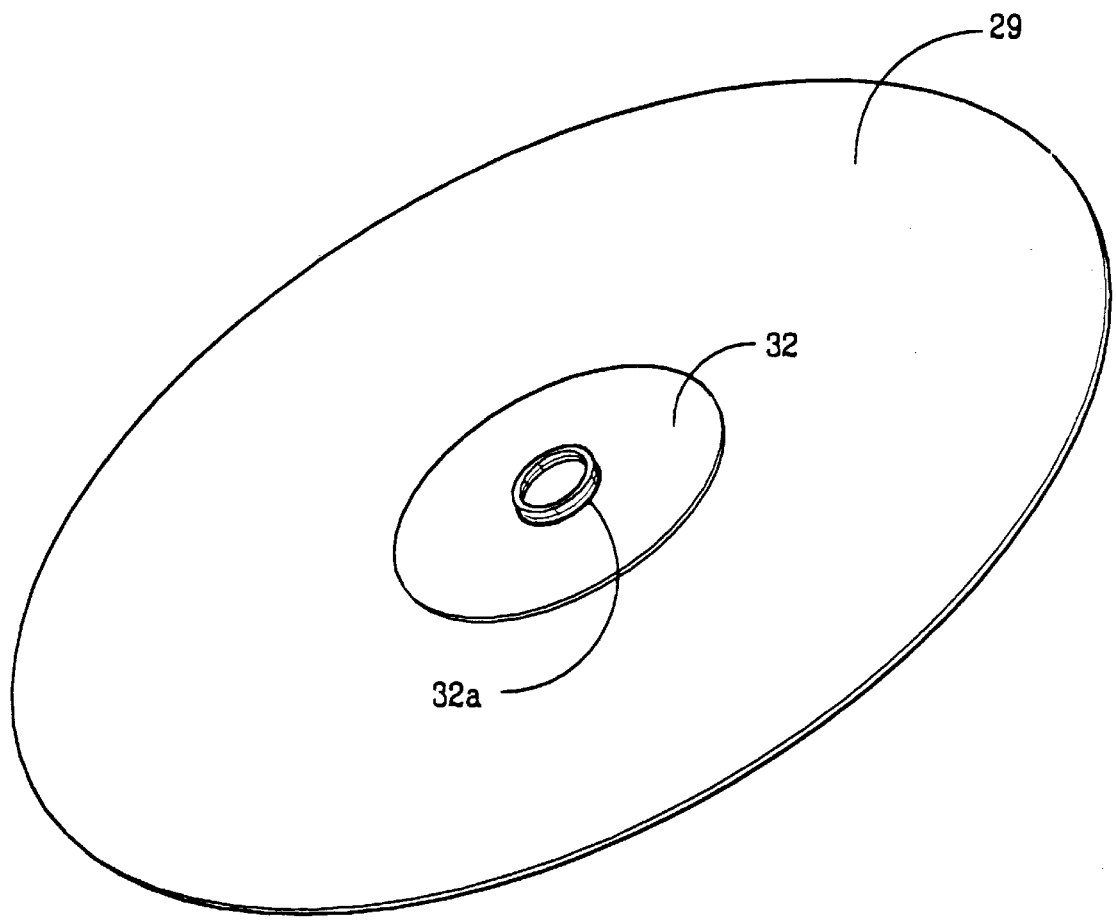
FIG. 2C shows a top view of the magnetic medium.

Magnetic medium 29 is best described with reference to FIG. 2C. As shown, magnetic medium 29 is substantially circular in shape. Additionally, medium 29 is made from a single piece of flexible material, such as Mylar. As is well-known in the floppy disk arts, a magnetic coating is placed over both sides of the Mylar, making it susceptible to storing data in the form of magnetically readable and erasable signals. A circular hub 32 is attached to the medium 29 and provides the mechanism for connecting the magnetic medium 29 to the drive spindle. Hub 32 is stamped from a single piece of ferrous material, such as sheet steel, forming circular lip 32a. Hub 32 and magnetic medium 29 are permanently bonded together with a hot melt adhesive, such as bynel adhesive resin manufactured by DuPont Corp.

Figure 3A:
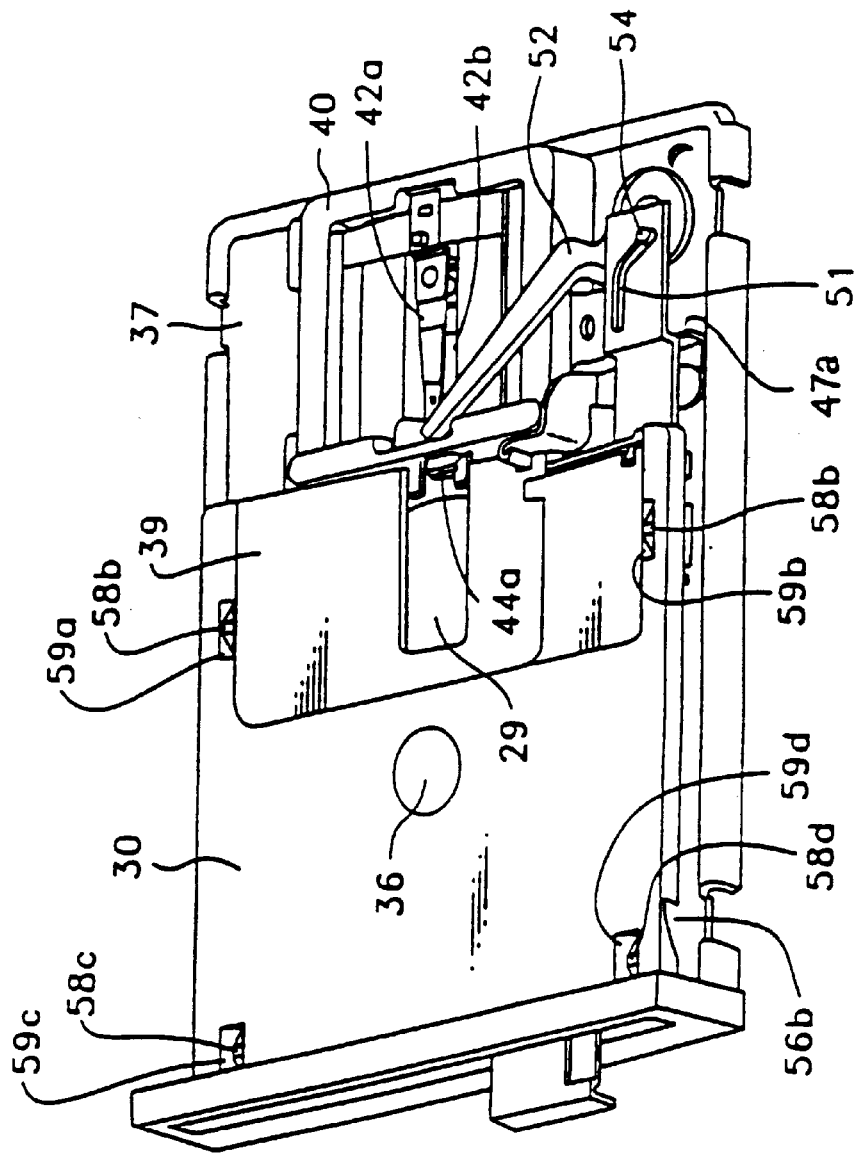
FIG. 3A shows the mini-cartridge seated in the mini disk drive with the read/write heads retracted.
Figure 3B:
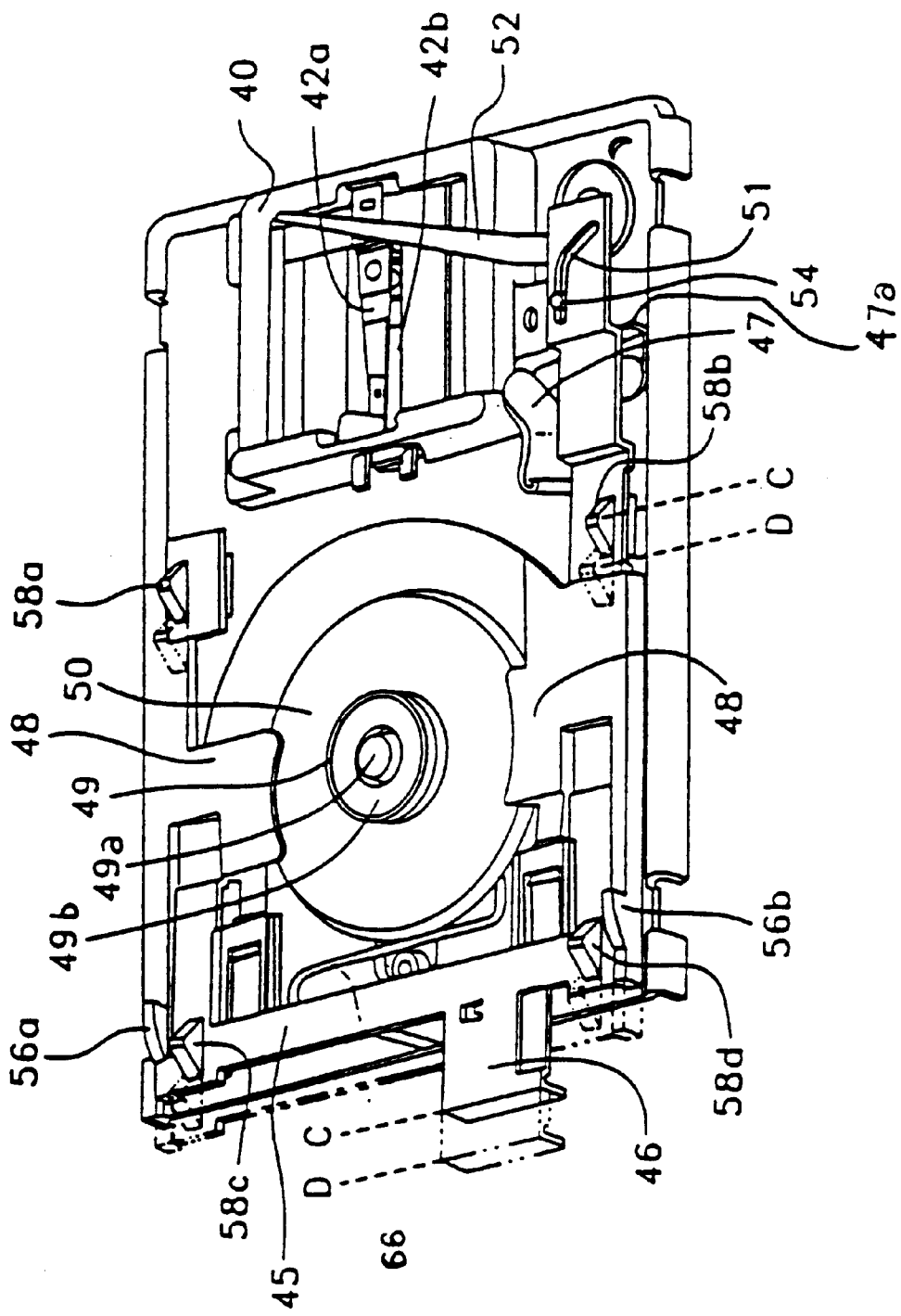
FIG. 3B shows the mini disk drive without the mini-cartridge.

FIGS. 3A and 3B show a mini drive 20 with the top cover removed. FIG. 3A shows the mini drive with a mini-cartridge 30 inserted and in an operating position in the drive. FIG. 3B, by contrast, shows mini drive 20 without a cartridge 30, revealing many of the internal drive components. Toward the back portion of the drive, a voice coil actuator 40 is coupled to drive platform 37. Actuator 40 has two arms 42a and 42b that move linearly in the X axis direction in response to an electrical signal. A read/write head (not shown) is coupled to the distal end of each arm 42a, 42b. Thus, when a mini-cartridge 30 is inserted into the drive (as shown in FIG. 3A), the heads in conjunction with arms 42a, 42b move over the surface of magnetic medium 29 reading and writing data.

The remaining internal components are best described with reference to FIG. 3B. As shown, spindle 49 is disposed toward the front of the drive platform 37 and is centered about the width (i.e. the Y axis) of drive platform 37. As with many disk drive spindles, spindle 49 provides the rotational interface between the mini disk drive 20 and the magnetic medium 29. As such, spindle 49 has an alignment pin 49a that engages the center of hub 32, ensuring a consistent alignment of the medium 29 in the mini disk drive 20. Additionally, spindle 49 has a magnetic top surface 49b that magnetically couples hub 32 to spindle 49. To derive its rotational force, spindle 49 is fixed to the drive motor rotor 50. Thus as the motor (only rotor portion shown) provides the rotational force to the motor rotor 50, spindle 49 also rotates, causing inserted magnetic medium 29 to rotate.

Motor rotor 50 is magnetically coupled to the motor, which is a bushing type pancake motor. That is, motor rotor 50 can be removed from the motor merely by overcoming the magnetic force that holds the motor rotor to its associated motor. Moreover, as stated above, mini-cartridge 30 is magnetically coupled to spindle 49. As a result, removal of mini-cartridge 30 from the drive 20 could cause motor rotor 50 to lift from the motor before the mini-cartridge 30 decouples from spindle 49. Motor hold-down wings 48, coupled to platform 37, prevent motor rotor decoupling. Accordingly, hold-down wings 48 overhang motor rotor 50. Clearance is provided between the overhanging hold-down wings 48 and the motor rotor 50 to allow motor rotor 50 to spin freely during normal operation. When a mini cartridge 30 is ejected from drive 20, hold-down wings 48 will hold motor rotor 50 while hub 32 separates from spindle 49.

A load/eject sled 45 is slidably disposed on drive platform 37 to facilitate cartridge loading and ejection in cooperation with other drive components. Cams 58 are attached to or, alternatively, integrally formed with, load/eject sled 45. The entire sled 45, in tandem with cams 58, slides on drive platform 37 in a direction substantially parallel to the X axis. Initially in a no-cartridge condition, sled 45 and cams 58 are in the proximate position indicated by the line C. After a mini-cartridge 30 is inserted, sled 45 and cams 58 move to a proximate position indicated by line D. During cartridge 30 ejection, eject button 46 is pushed by a user and, as a result of the force supplied by the user, moves sled 45 from a position proximate to the line indicated by D to a position proximate to the line indicated by C. Accordingly, cams 58 are likewise forced to move to the position proximate to the line indicated by C. As is described more fully below, this movement of cams 58 causes a mini-cartridge 30 to eject from the drive 20. Additionally, as is described more fully below, cartridge locks 56 are fixed on both sides of the drive platform 37 and are used to engage and lock a mini-cartridge 30 to drive platform 37 during the cartridge insertion process. These cartridge locks 56 cooperate with cams 58 to provide cartridge 30 insertion and ejection.

A head protect lever 52 is pivotally mounted at its proximate end to drive platform 37 and secures the read/write heads when no cartridge is in the drive 20. Pivot pin 54 is connected to the proximate end of head protect lever 52 and rides in head release slot 51 of load/eject sled 45. When no cartridge 30 is in the drive, head release slot 51 allows a spring to actuate head protect lever 52 rearwardly via pivot pin 54. As a result, arms 42 are retracted. On the other hand, when a cartridge 30 is inserted into drive 20, head release slot 51 forces head protect lever 52 forward, releasing arms 42 and enabling them to move over medium 29.

A cartridge eject lever 47 is pivotally mounted proximately in the back of the drive platform 37 in front of actuator 40. As is described more fully below, lever 47 provides two functions: Opening shutter 39 during cartridge 30 insertion; and ejecting cartridge 30 during cartridge ejection.

The insertion of a mini-cartridge 30 into mini drive 20 is best described with reference to FIGS. 4A through 4F and 5. Starting with FIG. 4A, a mini-cartridge 30 is outside of drive 20 (with the cover and front panel removed for clarity) prior to insertion. At that moment, cams 58 are proximate to the position indicated by line C. Head protect lever 52 has arms 42 in a retracted position. Eject lever 47 is biased in a counter-clockwise position. And, sled 45 is locked into the position proximate to line C, via eject lever tab 47 engaging sled tab 53, and spring loaded by sled spring 66 (best viewed in FIG. 3B).

Figure 4A:
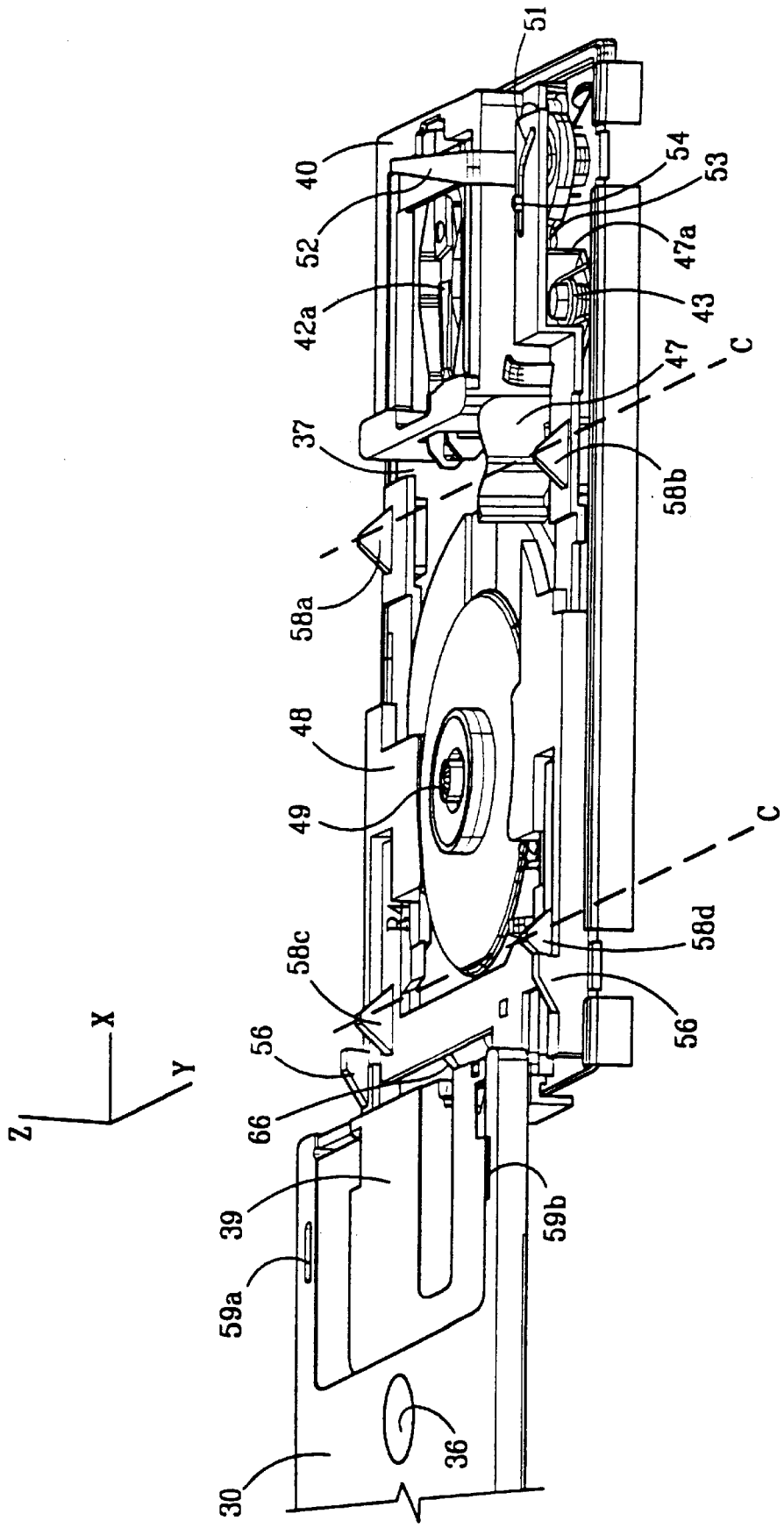
FIG. 4A through FIG. 4D show the mini-cartridge at progressive stages of insertion into the mini disk drive.
Figure 4B:
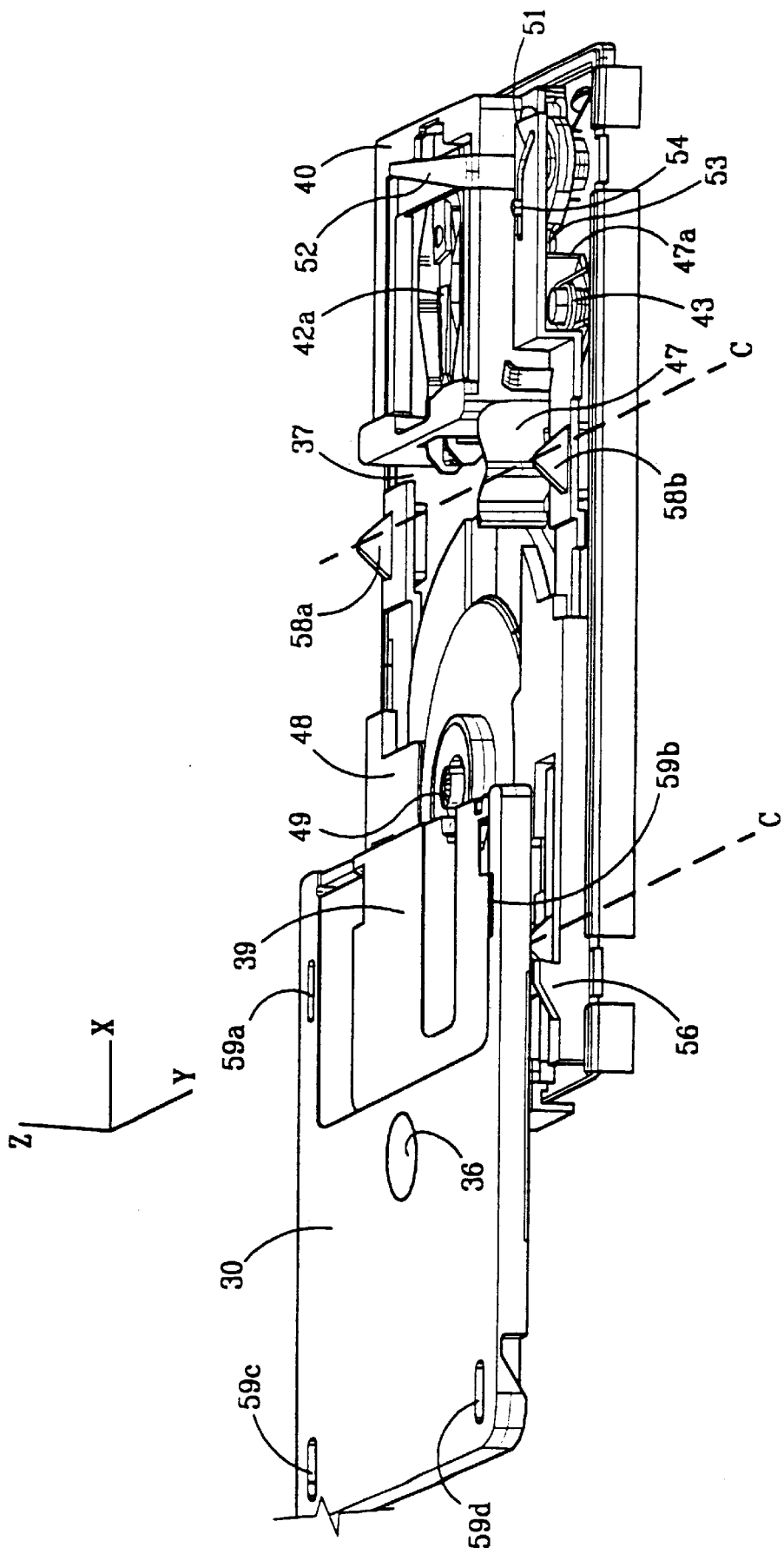

Referring now to FIG. 4B, as mini-cartridge 30 enters drive 20, it rides along the top of the forward set of male cams 58c, 58d. Front female cam openings 59a, 59b in mini-cartridge 30 are sized and located such that they do not match-up with the first set of male cams 58c, 58d encountered by the mini-cartridge 30. As a result, male cams 58c, 58d lift cartridge 30, ensuring that it enters above and clears spindle 49 during mini-cartridge 30 insertion into drive 20.

Figure 4C:
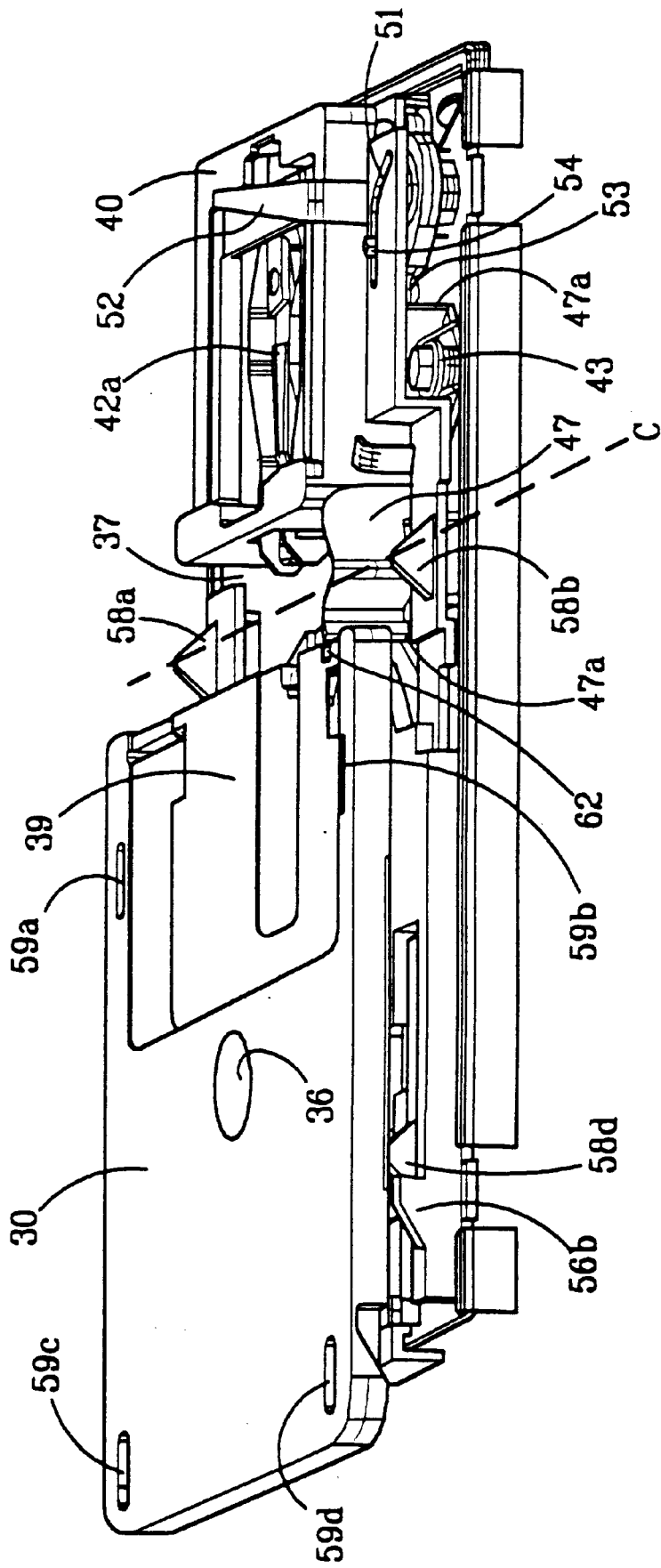

Referring next to FIG. 4C, as mini-cartridge 30 enters further into drive 20, nose 47a of eject lever 47 enters shutter slot 64 and contacts the mini-cartridge shutter latch 62. As mini-cartridge 30 is urged yet further into drive 20, eject lever 47 pivots clockwise and moves shutter 39 away from media aperture 60, exposing the magnetic medium 29 disposed within the mini-cartridge shell. Meanwhile, spring 43 provides a counter-clockwise bias on eject lever 47. Thus, simultaneous to eject lever 47 opening shutter 39, eject lever 47 is spring loaded. Additionally, as eject lever is rotated clockwise, eject lever tab 47a, which is integrally formed with eject lever 47, also begins to rotate clockwise.

Figure 4D:
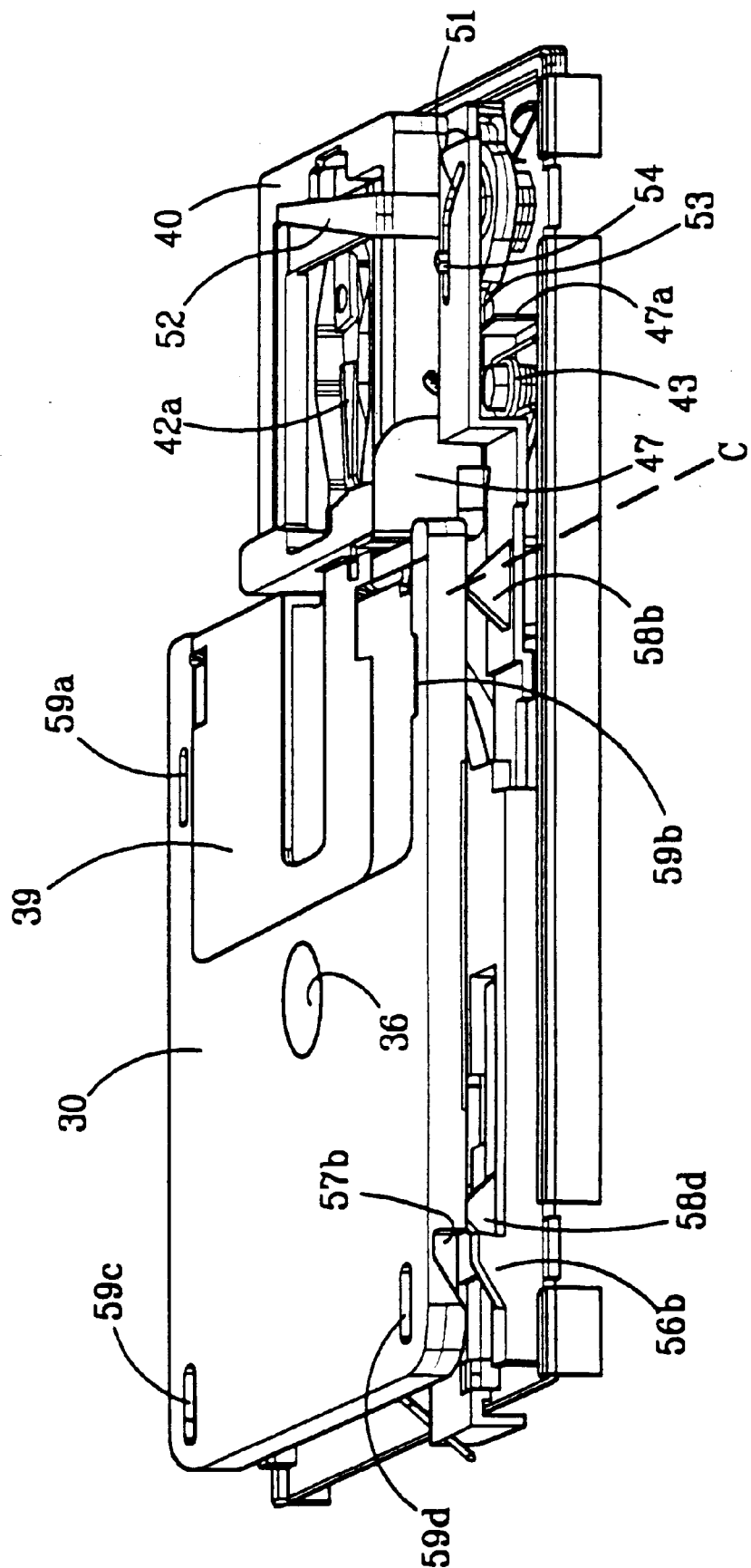

FIG. 4D shows mini-cartridge 30 in the most forward position in drive 20. At that moment, shutter 39 is fully open and eject lever 47 is pivoted fully clockwise and loaded against spring 43. However, cartridge 30 is not yet seated on spindle 49 and head protect lever 52 has not yet released the heads. Eject lever tab 47a is now fully rotated clockwise, away from sled tab 53 (see FIG. 6B for best view of eject lever tab 47a and sled tab 53 engagement).

Figure 4E:
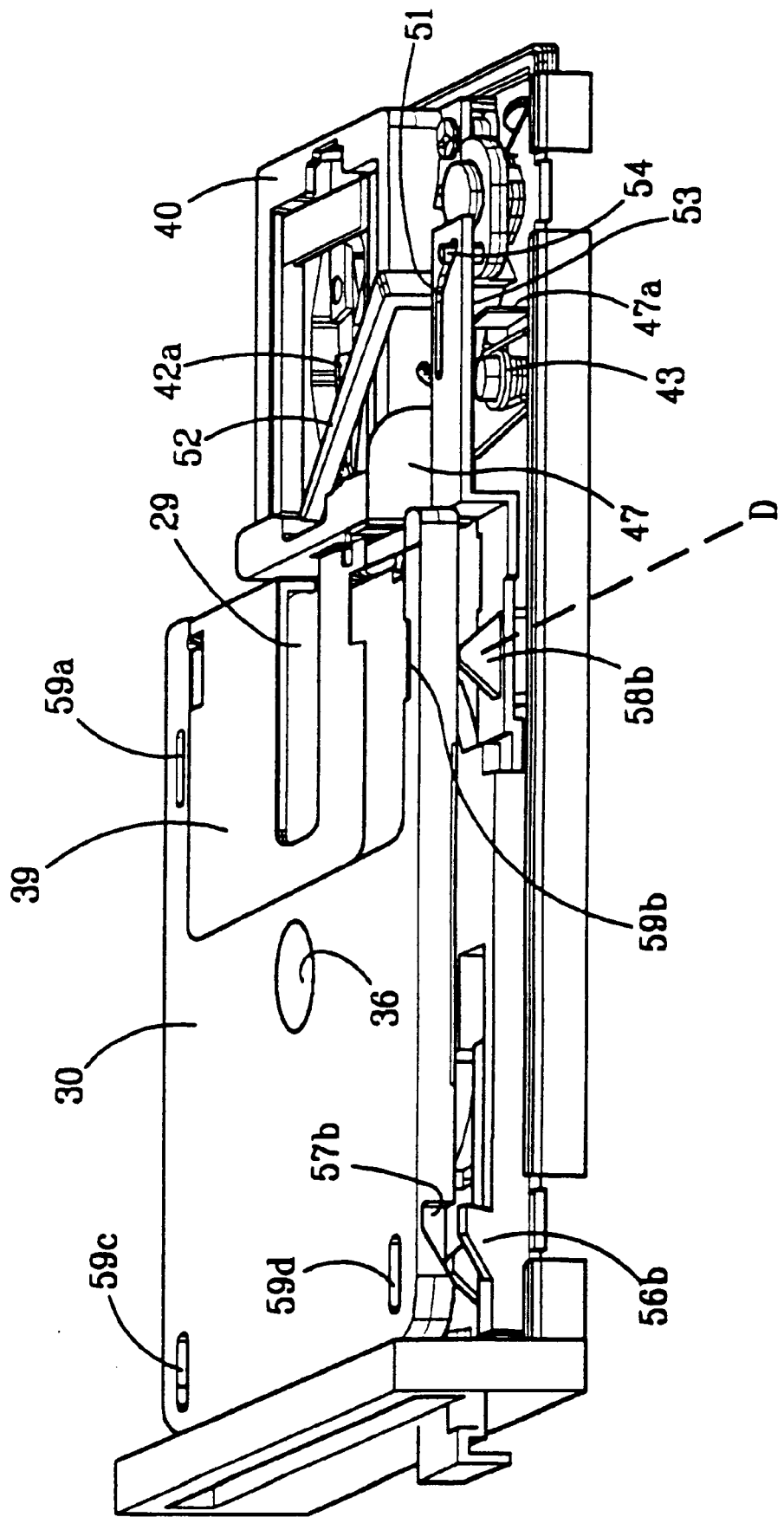
FIG. 4E shows the mini-cartridge fully translated horizontally into the mini disk drive in an elevated, unseated position.

FIG. 4E shows the release of sled 45 and forward movement of sled 45. After the eject lever tab 47a has moved away from sled tab 53. The sled is free to move from a position proximate to line C to a position proximate to line D. With the sled now free, spring 66 provides the bias to move sled 45 accordingly. As a result of the sled movement, cams 58 are moved to the D position, providing proper alignment with corresponding cam openings 59 and head protect slot 51 moves forward engaging pin 54 and releasing head protect lever 52.

Figure 4F:
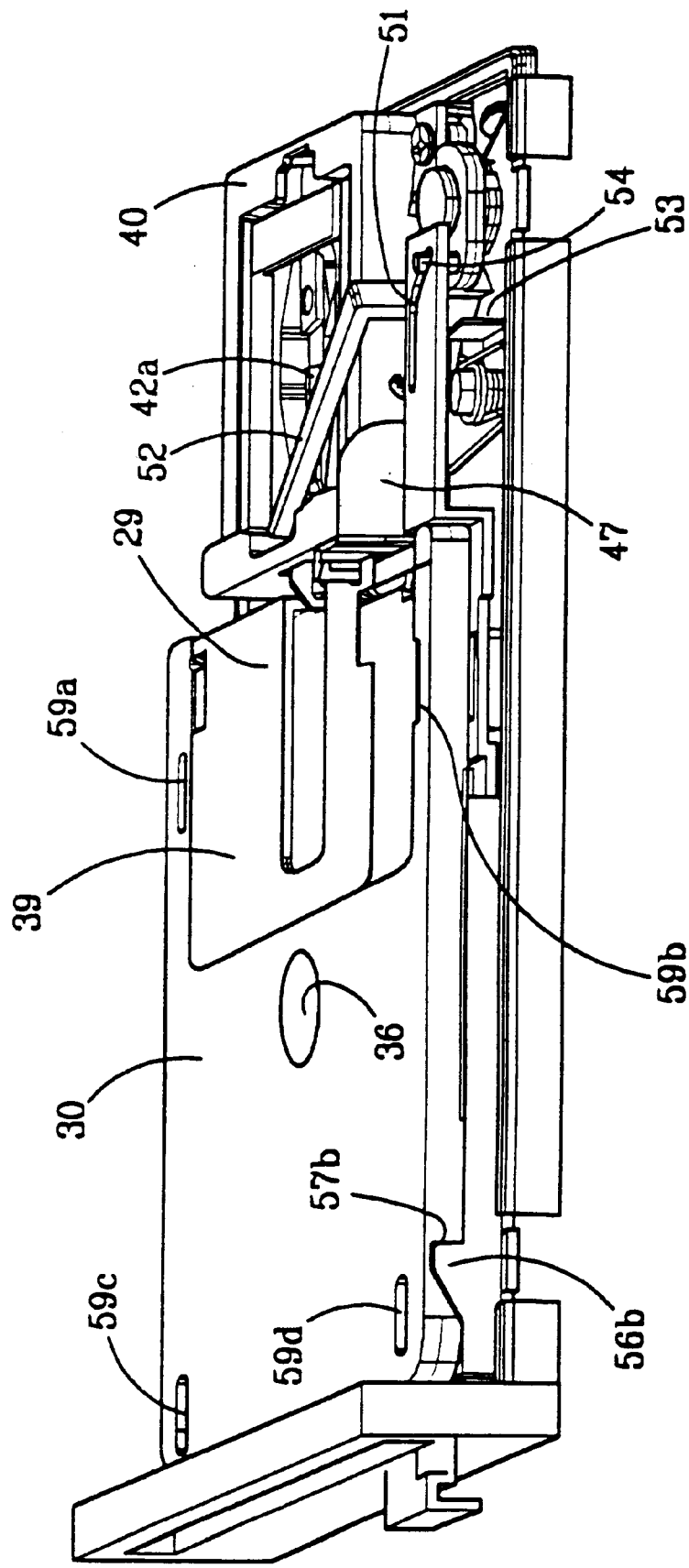
FIG. 4F shows the mini-cartridge seated in operational position in the mini disk drive with the heads engaging the magnetic medium.
Figure 5:
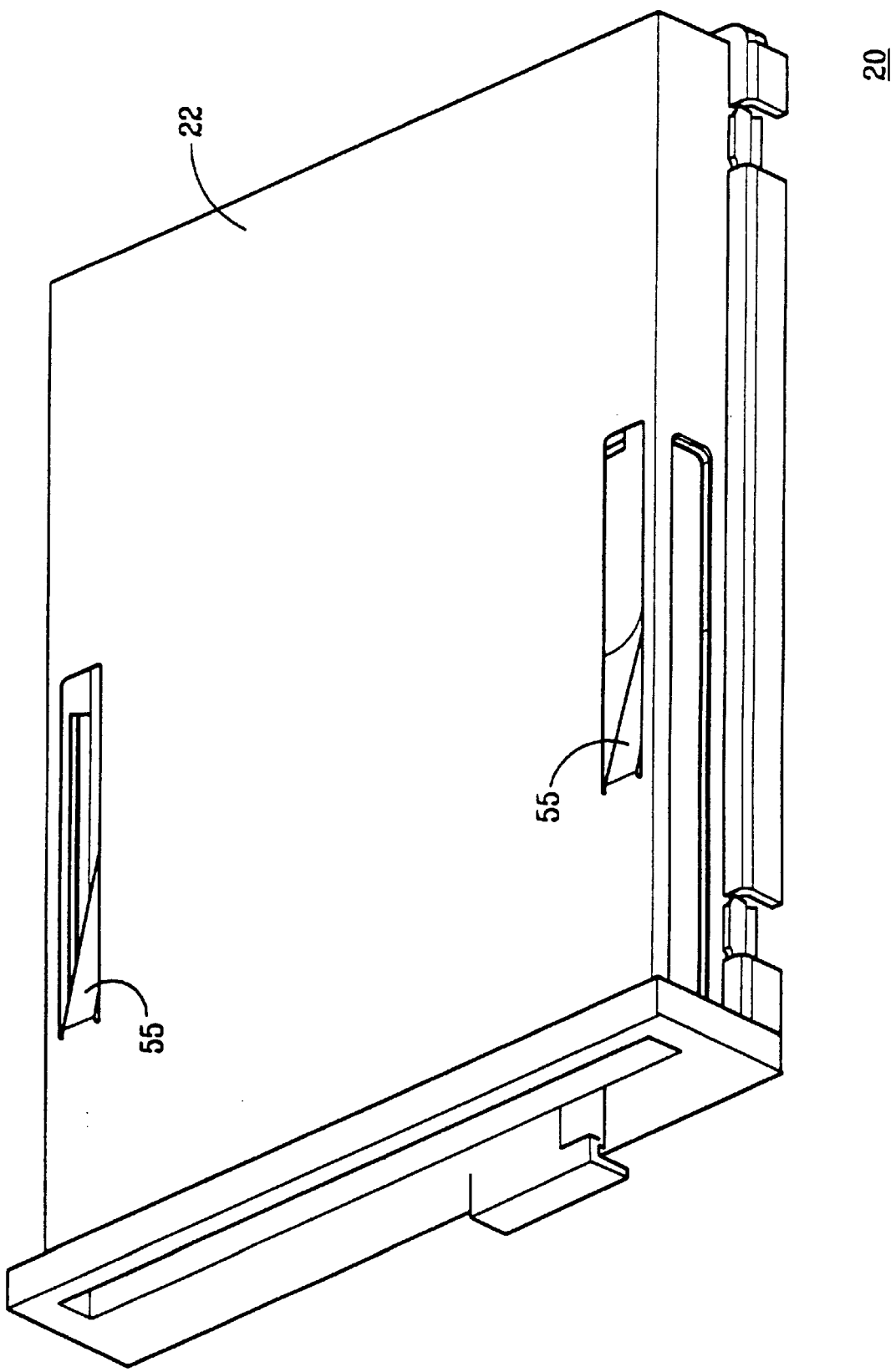
FIG. 5 shows the top of the mini disk drive exterior.

FIG. 5 in conjunction with FIG. 4F, illustrates the final mini-cartridge 30 loading step. Referring first to FIG. 5, cantilever springs 55 are shown extending downwardly from drive cover 22. These cantilever springs 55, force mini-cartridge 30 down as cartridge 30 fully enters drive 20. However, cartridge 30 is forced by cams 58 to a raised position until cam openings 59 on the mini-cartridge 30 are properly aligned with the matching male cam s 58 on the sled 45. At that moment, the cantilever springs 55 urge mini-cartridge 30 downwardly onto male cams 58, as shown in FIG. 4F. Substantially simultaneous to the cam engagement, drive spindle 49 enters the corresponding circular lip 32a on the mini-cartridge 30 and magnetically engages hub 32.

Figure 6A:
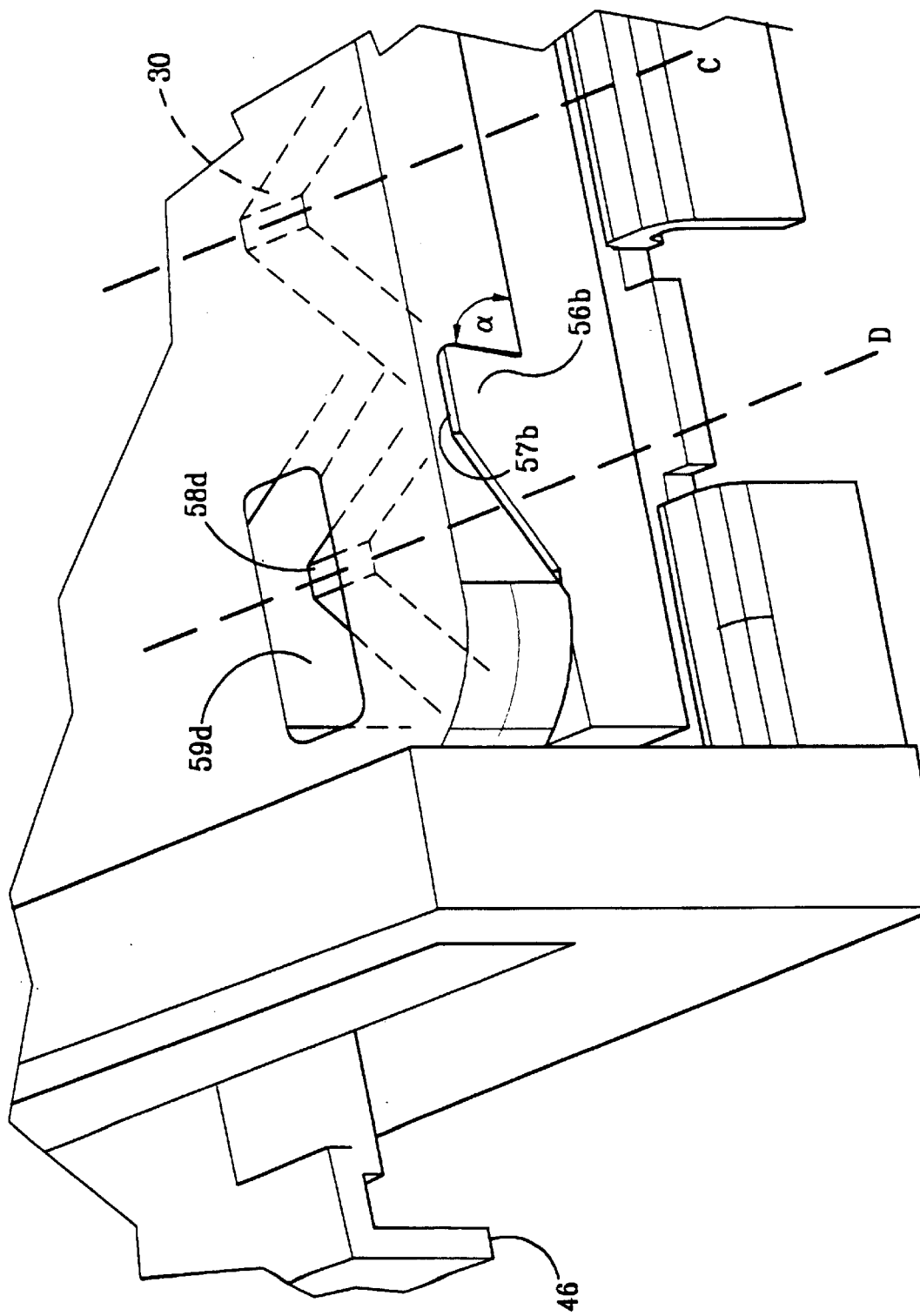
FIG. 6A shows the male camming surface and the cartridge lock fully seated into the female camming surface and the cartridge lock mating surface, respectively.

According to an aspect of the invention, wedge locks 56 engage the corresponding wedge cut-outs 57 on the mini-cartridge shell. FIGURE.6A provides an expanded view of the interlocking of wedge 56b with cut-out 57b in cartridge 30. Wedges 56 provide a ramped surface on their front side and an acute angled surface on their back sides. The angled surface, as indicated by the angle α, is about 80° in the present embodiment. However, those skilled in the art will recognize that other angles could be substituted for 80 degrees while still providing satisfactory results. Eject lever 47 (shown in FIG. 4F) applies a translational bias to cartridge 30, urging cartridge 30 outwardly. As a result, wedges 56 in cooperation with eject lever 47 lock cartridge 30 into place in drive 20. Mini-cartridge 30 is now ready for access by the read/write heads.

When a user desires to eject a cartridge 30 from the drive, the process is substantially reversed. The user begins by pushing the eject button 46. The force of this action causes cams 58 to move from their location proximate to the line indicated by D toward a point proximate to the line indicated by C. As best understood in conjunction with FIG. 6A, such lateral translation causes cams 58 to engage the corresponding female cammed surfaces 59. As cams 58 move further toward a position proximate to the D line, cartridge 30 begins to lift vertically from drive 20 (in the Z axis direction). When cams 58 are moved substantially to the D line, the bottom of cartridge 30 lifts above the top of spindle 49 and the top of wedges 56. Simultaneously, sled tab 53 is also moved toward the rear of the drive once sled 45 has moved to a position At that moment, spring 43 pivots the eject lever 47 counter-clockwise, simultaneously ejecting the cartridge 30 and closing shutter 39.

In order to provide forward compatibility to the host computer 23, a caddy 31 is provided. Caddy 31 adapts the mini-cartridge 23 to a full size drive 33. The full size drive 25 is the aforementioned ZIP drive which is disclosed and claimed in U.S. Pat. No. 5,530,607, entitled"WING ATTACHMENT FOR HEAD LOAD/UNLOAD IN A DATA STORAGE DEVICE" by Jay Spendlove on Jun. 25, 1996 and U.S. Pat. No. 5,508,864 entitled "FLEXURES WHICH REDUCE FRICTION IN AN ACTUATOR FOR DATA STORAGE DEVICE" by John Briggs granted on Apr. 16, 1996. and in U.S. applications Ser. No. 08/398,576 filed Mar. 3, 1995 entitled "HEAD PARK MECHANISM IN A DATA STORAGE DEVICE FOR PREVENTING ACCIDENTAL DAMAGE" by David Jones and U.S. patent application Ser. No. 08/398,576 filed Mar. 3, 1995 entitled "Movable Internal Platform for a Disk Drive." These applications are incorporated herein by reference.

Obviously, a mini-cartridge 30 and a full-size cartridge have a number of differences that prevent the mini-cartridge from directly operating in a full-size drive. Perhaps, the most obvious of these differences is size. Mini-cartridge 30 has a much smaller form factor than a full-size drive cartridge. Whereas, a mini-cartridge is about 1⅞" square and about ⅒" high, a full size drive cartridge is about 3⅞" square and ¼" high. Other differences between the cartridges and the drives also require adaptation to enable a mini-cartridge 30 to operate in a full-size drive. For example, the mini-cartridge rotates slightly faster than the rotation rate of a full size drive cartridge (e.g., 3267 rpms versus 2960 rpms for a full-size drive cartridge). Caddy 31, described more fully below, accepts a mini-cartridge 30 and adapts it for use in a full-size drive.

Figure 7A:
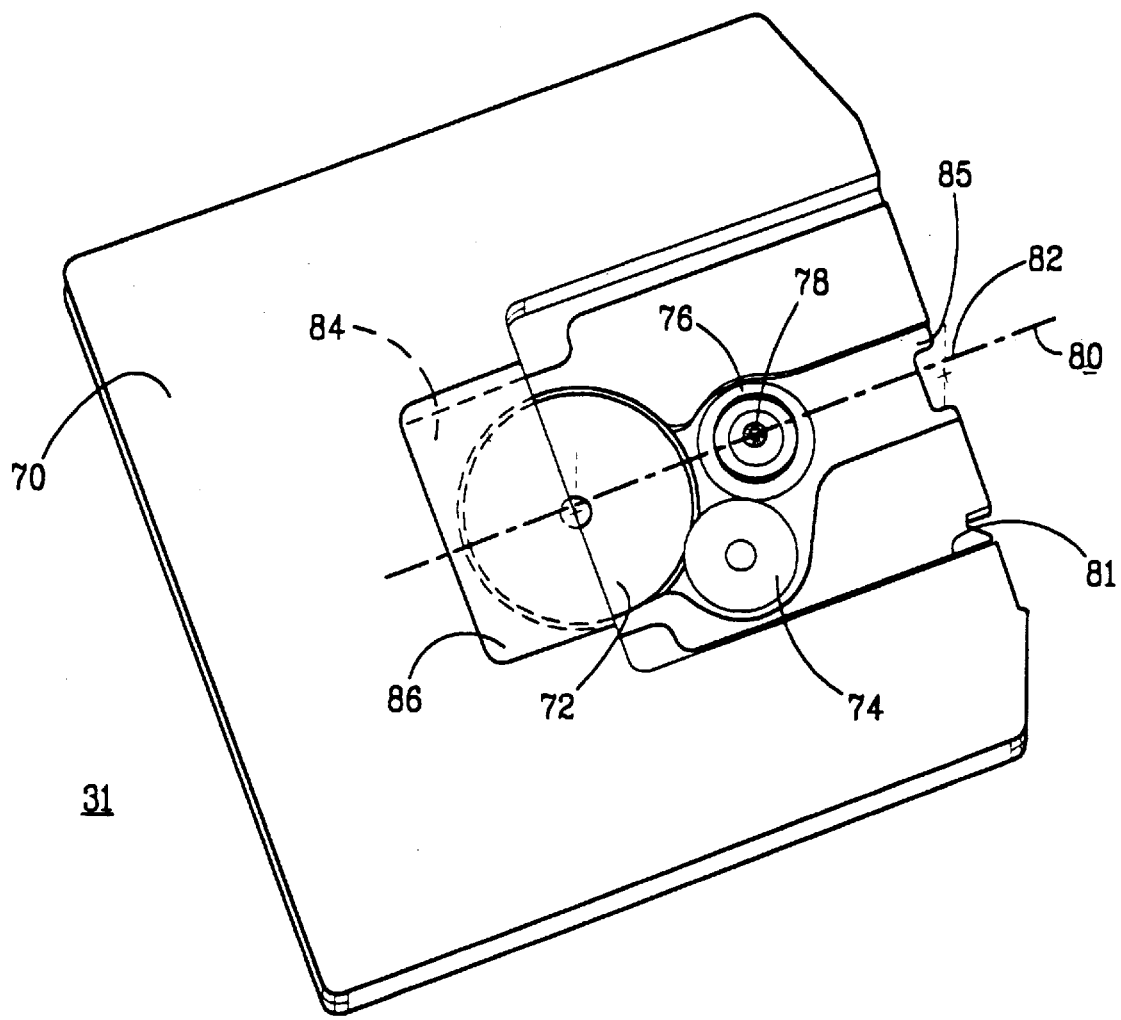
FIG. 7A shows a top perspective view of the caddy without a mini-cartridge.
Figure 7B:
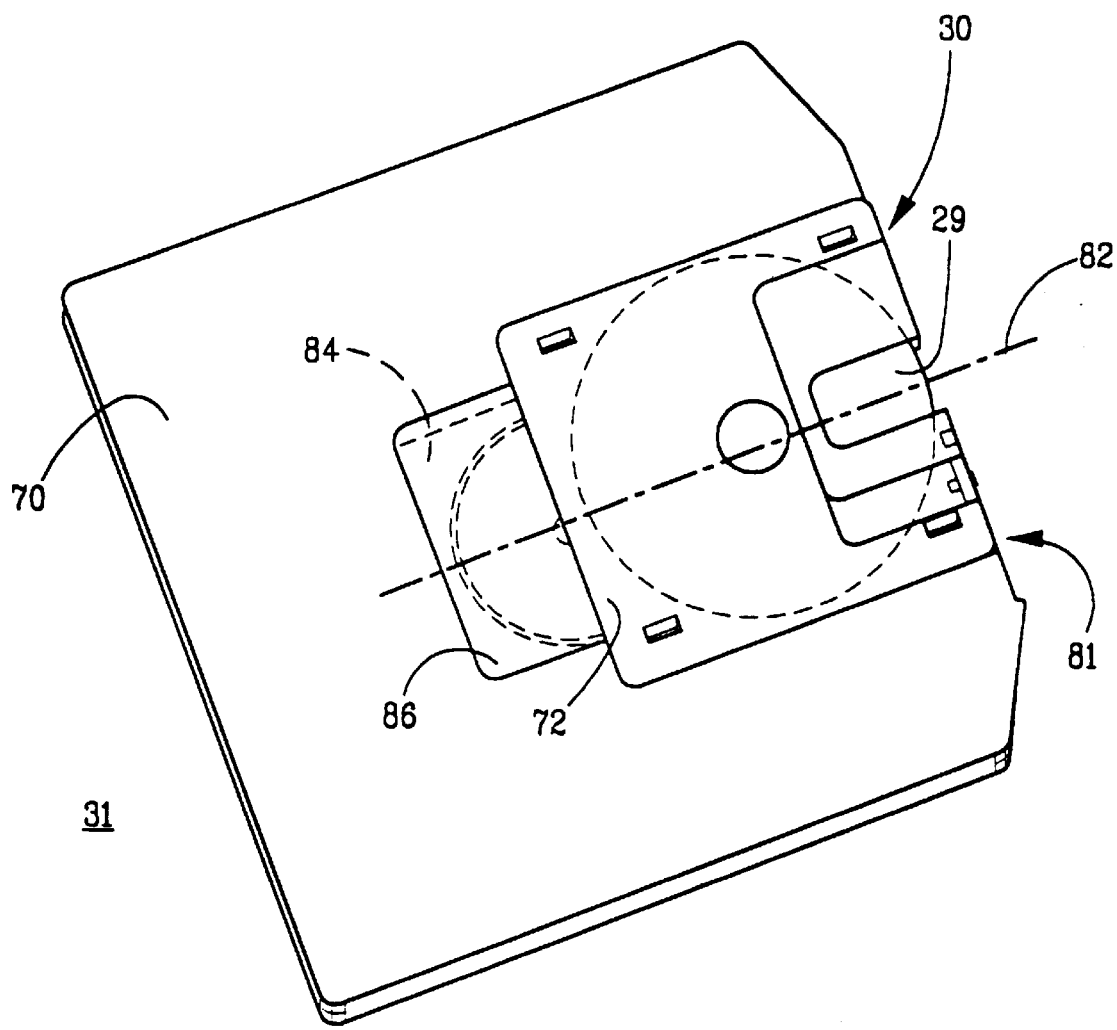
FIG. 7B shows a top perspective view of the caddy with a mini-cartridge inserted.

Referring to FIGS. 7A and 7B, a presently preferred embodiment of caddy 31 is presented. FIG. 7A shows caddy 31 without a mini-cartridge 30, revealing the internal components of caddy 31. FIG. 7B shows caddy 31 with a mini-cartridge 30 snapped into place. As is best shown in FIG. 7A, caddy 31 comprises a caddy body 70 for carrying and adapting the mini-cartridge form factor to the full-size form factor, a drive mechanism 72, 74, 76 for translating power from the full-size drive axis of rotation to the mini-cartridge axis of rotation, a spindle 78 for rotating mini-cartridge 30, and a gear cover 86 for securing main gear 72.

Caddy body 70 is shaped and sized to substantially the same dimensions as a full-size ZIP cartridge and has special features added to adapt a mini-cartridge 30. A depression 81 is formed in the top of caddy body 70. Depression 81 has a rectangular footprint for accepting a mini cartridge 30, and has an adjacent rectangular depression 84 to provide space for the insertion of main gear 72. A cover 86 is disposed overtop depression 84 for holding main gear 72 in place, while allowing gear 72 to adjust to the full-size drive spindle. The depth of depression 81 is such that magnetic medium 29 is disposed at about half the height of caddy body 70, thereby aligning the medium 29 with the height requirements of the full-size medium. Caddy body 70 also includes a lower depression 85. Depression 85 provides space for the drive mechanism 72, 74, 76 to reside below the space occupied by mini-cartridge 30 and provides an opening for the lower full-size drive read/write head to enter the caddy 31 and access magnetic medium 29.

The drive mechanism 72, 74, 76 translates power from the full-size drive motor and spindle to spindle 78 for rotating a mini-cartridge 30 placed in caddy 31. Main gear 72 emulates a full-size cartridge hub and couples to the full-size drive spindle. As such, main gear 72 floats, as does a full-size cartridge hub, and adjusts its location to engage the full-size drive spindle. Thus, when caddy 31 is inserted into a full-size drive, the full-size drive spindle engages main gear 72 as if gear 72 were a full-size drive hub and the caddy were a full-size cartridge. As such, main gear 72 is formed of a ferrous material, or employs a ferrous material, to allow magnetic coupling with the full-size drive spindle. As the full-size spindle rotates main gear 72, power is provided to the entire drive mechanism of caddy 31.

Gears 74 and 76 translate power from main gear 72 to spindle 78. Gears 74 and 76 are rotatably coupled to caddy body 70 by conventional methods, such as metal or plastic pins. Spindle 78 is fixed to spindle gear 76 such that when gear 76 rotates, spindle 78 also rotates. Furthermore, the center axes of spindle 78 and spindle gear 76 are coincident, ensuring that a stable axis of rotation is provided to a mini-cartridge 30 inserted into caddy 31. Spindle 78 is located within the caddy body 70 such that it engages magnetic medium 29 (see FIG. 7B) at the appropriate height and plane (i.e., on the same plane as media for a full-size drive). Furthermore, spindle 78 emulates the spindle of a mini-drive 20 in engaging a mini-cartridge 30. That is, spindle 78 magnetically couples with hub 32 of a mini-cartridge 30 inserted into caddy 31.

During operation, main gear 72 rotates clockwise in accordance with the rotation of the full-size drive motor. Obviously, spindle 78 must also rotate clockwise so that medium 29 rotates properly in the full-size drive. Accordingly, intermediate gear 74, is coupled between gear 72 and gear 76. As gear 72 rotates clockwise, gear 74 rotates counter-clockwise, causing gear 76 and spindle 78 to also rotate clockwise. Furthermore, as noted above, medium 29 of mini-cartridge 30 rotates within a mini drive 20 at the same angular rotation as a full-size cartridge medium rotates within a full-size drive. Because of the obvious size differences, the angular rotation of a mini-cartridge medium 29 translates to a rotational speed that is slightly faster than the rotational speed of a full-size medium. When operating in caddy 31, the same proper rotation speed of a mini-cartridge 30 must be maintained. Accordingly, gear ratios of 72, 74, 76 must be selected such that the magnetic medium 29 rotates at an angular velocity approximately equal to the angular velocity of full-size drive magnetic medium, or about twice the rotational speed.

Additionally, a point on the circumference of the medium 29 farthest from the centroid of the main drive mechanism 72 defines a forward-most point 82. The forward-most point 82 also lies on a center axis 80, which is defined by points where the vertical center axes of the main drive mechanism 72 and of the spindle 78 bisect the plane defined by the medium 29. The spindle 78 is located along the center axis 80 such that the forward-most point 82 of the mini cartridge medium 29 is coincident with a forward most point of a full-size medium of a standard, full-size disk cartridge. Such location of the mini cartridge medium 29 enables the heads of the full-size drive to properly engage the medium 29.

Those skilled in the art will readily appreciate that many modifications to the caddy are possible within the scope of the invention. For example, a belt drive mechanism could be used in place of gears, or additional gears could be used to provide a more stable rotation. Accordingly, the caddy is not limited to the single embodiment disclosed.

The ZIP drive 33 has an interface 24 for transferring signals between the full size drive 33 and the host computer 35. The interface 34 is shown in FIG. 8.

FIG. 8 shows the ZIP drive interface 26 between the read write channel for the disk (lower right side of diagram) and the host computer (upper left side of diagram). It includes an AIC chip 101 which performs the SCSI 102, the DMA 103, and disk formatter 104 functions. The interface also includes a PHAEDRUS 105 which includes an 8032 micro controller 106, a 1K Ram 107 and an ASIC 108. The ZIP interface transfers data between the input/output channel of the ZIP drive and SCSI devices such as the host computer.

Although a particular embodiment of the invention has been shown and described, other embodiments and modifications will occur to those of ordinary skill in the art which fall within the scope of the appended claims.

What is claimed is:
1. A data storage system comprising:
    a disk drive having at least one cam with a first surface, said cam being movably disposed within said disk drive; and,
    a data cartridge comprising an outer shell, a storage medium rotatably disposed within said outer shell, and at least one cammed surface formed within said outer shell, said cammed surface being substantially complementary to said first surface;
    said cam aligning with said cammed surface when said cartridge is inserted into the disk drive such that said cartridge moves substantially perpendicular to an axis of rotation of said storage medium to an operational position.
2. The data storage system as recited in claim 1 wherein said cam moves from a second position to a first position in response to a cartridge ejection signal, said cam engaging said cammed surface and moving said cartridge substantially perpendicular to an axis of rotation of said data storage medium to an eject position.
3. A data storage system, comprising:
    a drive apparatus comprising a first projection disposed proximate a back portion of said drive apparatus and a second projection disposed proximate a front portion of said drive apparatus and wherein at least one of said first and second projections is movable to cause cartridge ejection,
    a data storage cartridge comprising:
    an outer shell;
    a data storage medium rotatably disposed within said outer shell;
    a first alignment opening disposed in an outer surface of said outer shell; and a second alignment opening disposed in said outer surface of said outer shell such that said data storage cartridge translates substantially perpendicular to an axis of rotation of said storage medium during insertion of said cartridge into said drive apparatus when said first alignment opening aligns with said first projection and said second alignment opening aligns with said second projection.
4. The data storage system as recited in claim 3 wherein said second projection provides a surface along which said outer shell travels during cartridge insertion into said drive.
5. The data storage system as recited in claim 4 wherein at least one of said first and second projections translate parallel to a planar surface of said cartridge during cartridge ejection causing said cartridge to translate substantially perpendicularly to an axis of rotation of said data storage medium.
6. The data storage system as recited in claim 5 wherein at least one of said first and second projections are substantially cam shaped.
7. The data storage system as recited in claim 6 wherein at least one of said first and second alignment openings comprise an inclined surface.
8. The data storage system as recited in claim 3 wherein said data storage cartridge comprises at least two first alignment openings disposed in said outer shell on opposite sides proximate a front portion of said cartridge.
9. The data storage system as recited in claim 3 wherein said data storage cartridge comprises at least two second alignment openings disposed in said outer shell on opposite sides proximate a front portion of said cartridge.

* * * * *